Feb. 1, 1966     I. E. ASKE     3,232,214
PORTABLE DISTILLING AND COOKING APPARATUS
Filed April 2, 1963     4 Sheets-Sheet 1

INVENTOR.
Irving E. Aske
BY
ATTORNEY.

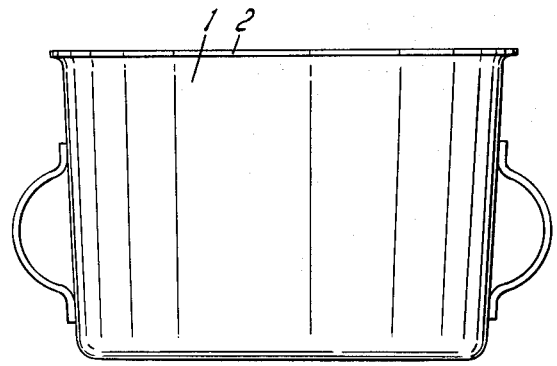
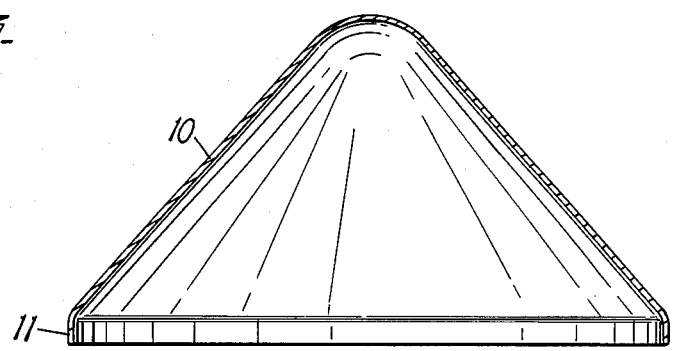
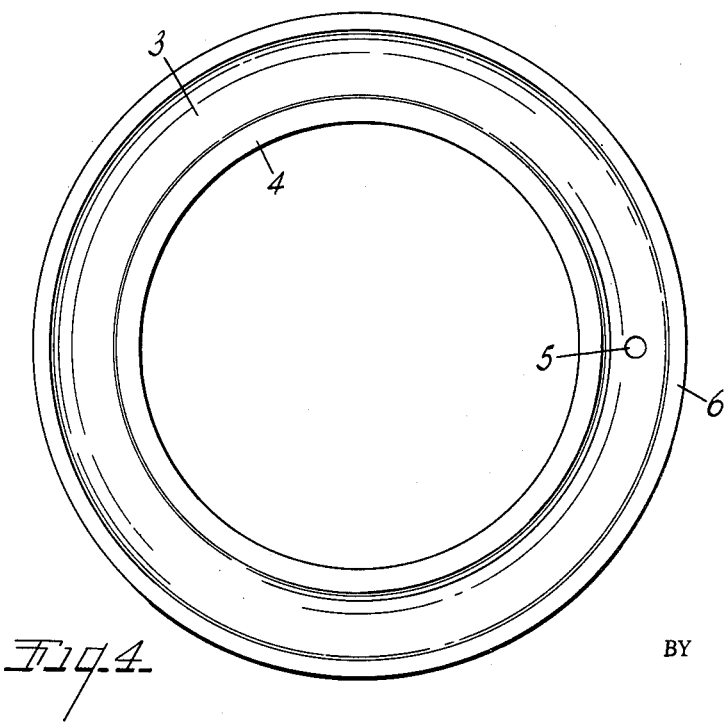

Feb. 1, 1966 I. E. ASKE 3,232,214
PORTABLE DISTILLING AND COOKING APPARATUS
Filed April 2, 1963 4 Sheets-Sheet 3

INVENTOR.
Irving E. Aske
BY
ATTORNEY.

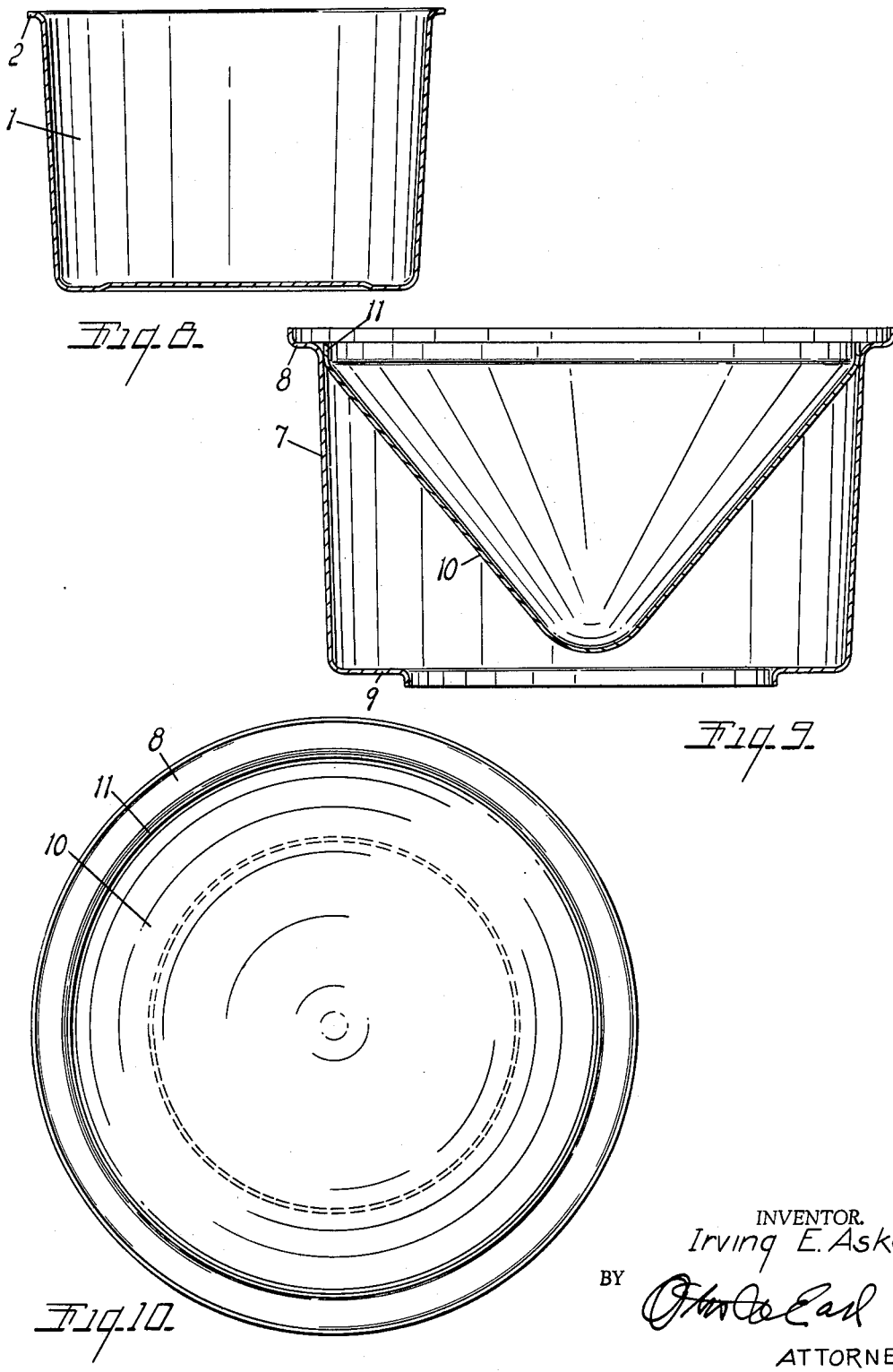

United States Patent Office 3,232,214
Patented Feb. 1, 1966

3,232,214
PORTABLE DISTILLING AND COOKING
APPARATUS
Irving E. Aske, 440 46th Ave.,
St. Petersburg Beach 6, Fla.
Filed Apr. 2, 1963, Ser. No. 270,107
6 Claims. (Cl. 99—340)

This invention relates to a portable apparatus adapted for use both for distilling and cooking.

The main objects of this invention are:

First, to provide a portable distilling and cooking apparatus adapted for domestic use in which the major parts are adapted for both uses.

Second, to provide an apparatus having these advantages which is highly efficient for both uses and which is simple and economical in structure and may be formed of relatively light weight stock.

Third, to provide an apparatus having these advantages which when used for cooking prevents the escape of steam into the atmosphere and the article being cooked from being burned or scorched as the result of so called boiling dry.

Fourth, to provide an apparatus having these advantages which may be economically produced, is convenient to use and is attractive in appearance.

Objects relating to details and economies of the invention will appear from the description to follow. The invention is defined and pointed out in the claims. A preferred embodiment of the invention is illustrated in the accompanying drawing, in which:

FIG. 3 is a side elevational view of the receptacle member.

FIG. 4 is a plan view of the condensate collector member.

FIG. 5 is a vertical section of the inner wall of the condenser unit.

FIG. 8 is a vertical section of the portable receptacle.

FIG. 9 is a vertical section of the condenser unit in reversed position from that shown in FIG. 2.

FIG. 10 is a plan view of the condenser unit positioned as in FIG. 9.

Figure 1:
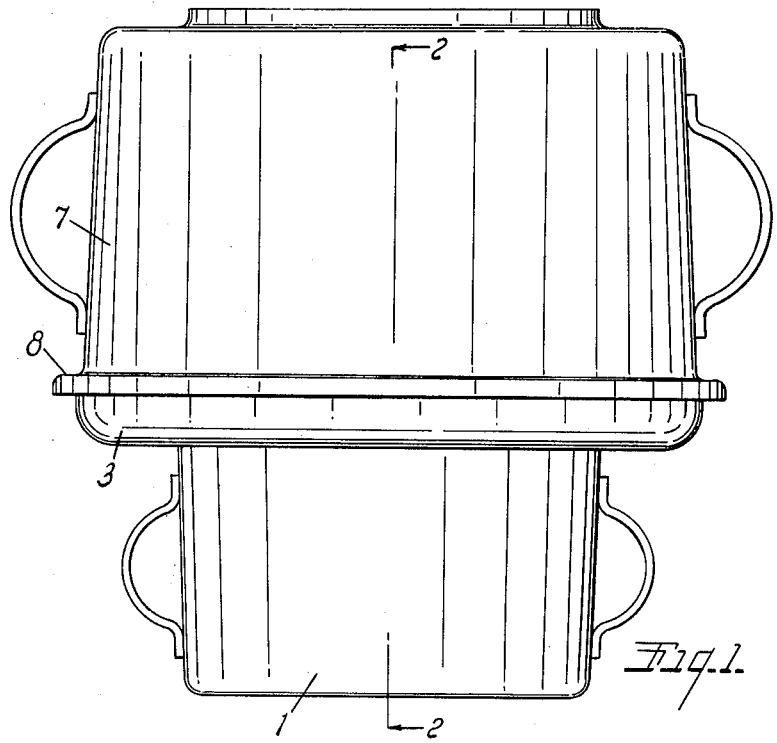
FIG. 1 is a side elevational view of an apparatus embodying my invention.

The embodiment of my invention illustrated in the accompanying drawings is especially designed for domestic use although it should be understood that it may be made in various sizes and is desirable for use in hotels, restaurants and the like.

While the embodiment of my invention illustrated is adapted for use both as a distilling apparatus and as a cooking apparatus it will be understood that my invention may be commercialized without including the distilling feature. My invention is especially desirable for use in portable apparatus and the embodiment illustrated comprises a receptacle 1 having an outturned flange like rim 2 on its upper edge. It is desirably formed of drawn sheet metal.

The condenser collector member 3 is annular and dimensioned to fittingly embrace the outturned flange of the receptacle 1 and has an inwardly projecting flange 4 on its inner edge adapted to supportingly engage the outturned flange 2 of the receptacle. This condenser collector member 3 is desirably of curved U cross section and has a distillate discharge opening 5 in the bottom thereof, this being adapted to discharge into a receptacle positioned thereunder.

The condensate collector member is provided with an outwardly projecting annular flange 6 on its outer edge.

Figures 6, 7:
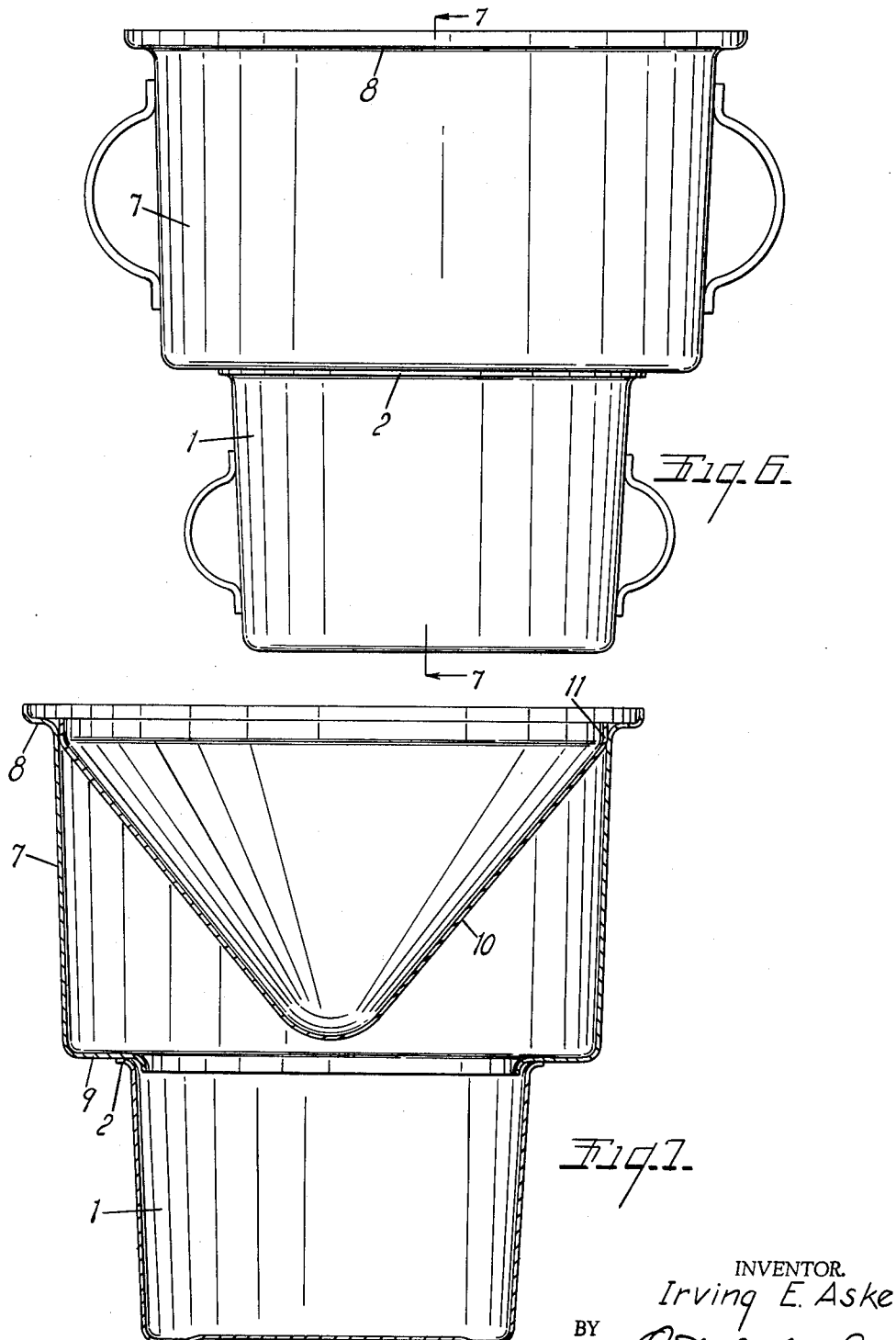
FIG. 6 is a side elevational view of the apparatus embodying my invention adjusted as a cooking apparatus.
FIG. 7 is a vertical section on a line corresponding to line 7—7 of FIG. 6.

The condenser unit of my invention comprises an outer cylindrical wall 7 having an angular outwardly projecting flange 8 on one end adapted to fittingly embrace an outwardly projecting rim or flange 6 of the condensate collector. It has an inwardly projecting annular flange 9 at its other end of such width or dimensioned so that it may be engaged with the receptacle, as is illustrated in FIGS. 6 and 7, when the condensate collector member 3 is not present.

In the embodiment illustrated the conical inner wall 10 of the condenser unit is provided with a flange like portion 11 fittingly disposed within the outer wall 7 and fixedly secured thereto. The securing means is not illustrated but it will be understood that it may be brazing or welding. The inner wall 10 of the condenser unit is of less vertical length or height than the outer wall so that its upper end is inwardly spaced relative to the flange 9 of the outer wall member.

Figure 2:
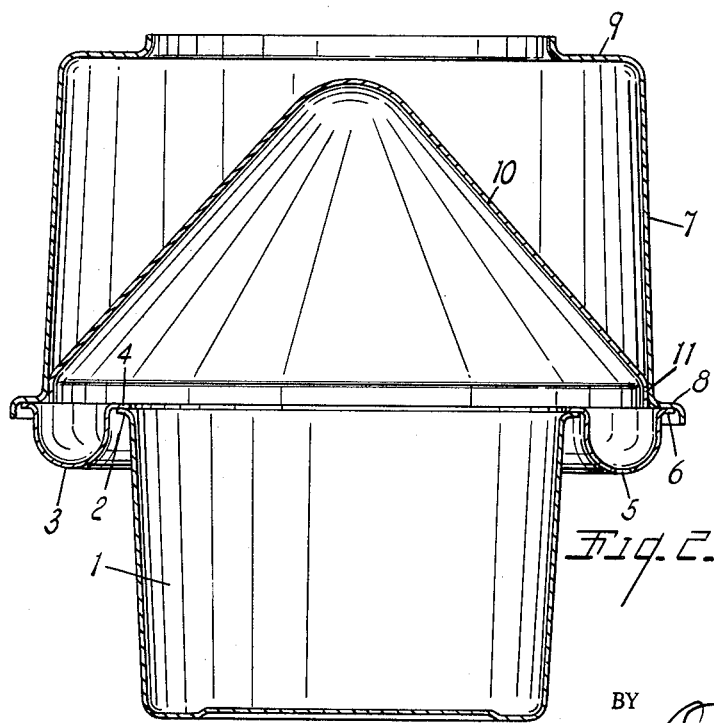
FIG. 2 is a vertical section on a line corresponding to line 2—2 of FIG. 1.

When the apparatus is used as a distilling apparatus the parts are arranged as in FIGS. 1 and 2. A receptacle 7 is provided for water and the inner wall member 10 is entirely surrounded by the coolant so that steam arising from the receptacle 1 is condensated and flows down the inner side of the inner wall 10 and into the condensate collector member 3. However, when it is desired to use the apparatus for cooking the annular condenser member 3 is removed and the condenser unit is disposed in inverted or reversed position from that shown in FIGS. 1 and 2 and see FIGS. 6 and 7. The condensing water or liquid is placed in the condenser member 10. With the parts thus arranged the condenser unit constitutes a cover for the receptacle and the condensed steam is discharged into the cooking receptacle 1. This not only results in preventing the escape of steam into the atmosphere around the burner but prevents the contents being cooked from becoming dry or scorched as results when all of the water is boiled out of a cooking receptacle.

In FIGS. 6 to 10 inclusive I have illustrated the use of the apparatus embodying my invention purely as a cooking apparatus and I have illustrated this arrangement as some users may not be interested in a complete apparatus adapted for distilling and cooking uses, as is illustrated in FIGS. 2 to 5 inclusive.

The parts entering into the structure are shown separately in the drawings to emphasize the fact that they may be formed of sheet metal or drawn from sheet metal.

I have not attempted to illustrate various modifications and adaptations as it is believed this disclosure will enable those skilled in the art to embody or adapt the invention as may be desired.

Having thus described the invention, what is claimed as new and desired to secure by Letters Patent is:

1. An apparatus of the class described comprising a portable receptacle adapted to receive liquid to be distilled and to be positioned on a heating means, said receptacle having an annular outwardly projecting flange-like rim, an annular condensate collector member of upwardly facing U-cross section embracing the upper end of said receptacle in laterally thrust sustaining engagement therewith and provided with a discharge opening at the outer side of said receptacle and having an inwardly projecting flange on its inner edge supportedly and removably seated on said rim on said receptacle, said condensate collector having an outwardly projecting annular flange on its outer edge, a condenser unit comprising a cylindrical outer wall having an inwardly projecting rim on its upper edge and an angular outwardly projecting downwardly facing flange on its lower edge supportedly and removably engaged with said flange on the outer edge of said condensate collector member and in lateral thrust sustaining engagement therewith, and a conical inner wall disposed centrally within said outer wall and terminating at its lower edge in a downwardly projecting flange fittingly disposed in and fixedly secured to said outer wall adjacent the bottom thereof, the upper end of said inner wall being in a plane adjacent but in downwardly spaced relation to the plane of the upper edge of said outer wall.

2. An apparatus of the class described comprising a portable receptacle adapted to receive liquid to be distilled and to be positioned on a heating means, said receptacle having an annular outwardly projecting flange-like rim, an annular condensate collector member of upwardly facing U-cross section embracing the upper end of said receptacle in laterally thrust sustaining engagement therewith and provided with a discharge opening at the outer side of said receptacle and having an inwardly projecting flange on its inner edge supportedly and removably seated on said rim on said receptacle, said condensate collector having an outwardly projecting annular flange on its outer edge, a condenser unit comprising a cylindrical outer wall having a flange on its lower edge supportedly and removably engaged with said flange on the outer edge of said condensate collector member, and a conical inner wall disposed centrally within said outer wall with its lower edge disposed in and fixedly secured to said outer wall adjacent the bottom thereof, the upper end of said inner wall being in a plane adjacent but in downwardly spaced relation to the plane of the upper edge of said outer wall.

3. An apparatus of the class described comprising a portable receptacle adapted to receive liquid to be distilled and to be positioned on a heating means, an annular condensate collector member of upwardly facing U-cross section embracing the upper end of said receptacle in laterally thrust sustaining engagement therewith and provided with a discharge opening at the outer side of said receptacle and having an inwardly projecting flange on its inner edge supportedly and removably seated on said receptacle, said condensate collector having an outwardly projecting annular flange on its outer edge, a condenser unit comprising a cylindrical outer wall having an inwardly projecting rim on its upper edge and an angular outwardly projecting downwardly facing flange on its lower edge supportedly and removably engaged with said flange on the outer edge of said condensate collector member and in lateral thrust sustaining engagement therewith, and a conical inner wall disposed centrally within said outer wall and terminating at its lower edge in a downwardly projecting flange fittingly disposed in and fixedly secured to said outer wall adjacent the bottom thereof.

4. An apparatus of the class described comprising a portable receptacle adapted to receive liquid to be distilled and to be positioned on a heating means, an annular condensate collector member of upwardly facing U-cross section supportedly mounted on and embracing the upper end of said receptacle to project outwardly from and in laterally thrust sustaining engagement therewith and provided with a discharge opening at the outer side of said receptacle and having an inwardly projecting flange on its inner edge supportedly and removably seated on said receptacle, said condensate collector having an outwardly projecting annular flange on its outer edge, a condenser unit comprising a cylindrical outer wall having a flange on its lower edge supportedly and removably engaged with said flange on the outer edge of said condensate collector member, and a conical inner wall disposed centrally within said outer wall with its lower edge disposed in and fixedly secured to said outer wall adjacent the bottom thereof.

5. An apparatus of the class described comprising a receptacle adapted to be positioned on a heating means, an annular condensate collector member detachably and supportedly mounted on said receptacle and provided with an outlet at the outer side of said receptacle, a condenser unit comprising an outer wall having an outwardly projecting flange at one end and supportedly and removably engageable with said condensate collector member and having an inwardly projecting flange at its other end supportably and removably engageable with said receptacle when said condensate collector member is removed from said receptacle, and a conical inner wall member disposed centrally within said outer wall member and fixedly and sealingly secured thereto adjacent the end thereof engageable with said condensate collector member, said outer and inner wall members defining a condensing liquid receptacle when said condenser unit is mounted on said condensate collector member and said inner wall member constituting a condensing liquid receptacle when said condenser unit is mounted directly on said receptacle.

6. An apparatus of the class described comprising a receptacle adapted to be positioned on a heating means, an annular condensate collector member detachably and supportedly mounted on said receptacle and provided with an outlet at the outer side of said receptacle, a condenser unit comprising an outer wall adapted at one end for supported and removable engagement with said condensate collector member and adapted at its other end for supported and removable engagement with said receptacle when said condensate collector member is removed therefrom, and an inner wall member disposed within said outer wall member and fixedly and sealingly secured thereto adjacent the end thereof which is engageable with said condensate collector member, said outer and inner wall members defining a condensing liquid receptacle when said condensing unit is mounted on said condensate collector member and said inner wall member constituting a condensing liquid receptacle when said condenser unit is mounted directly on said receptacle.

References Cited by the Examiner

UNITED STATES PATENTS

| | | | |
|---|---|---|---|
| 1,364,115 | 1/1921 | Kania | 126—381 |
| 1,439,204 | 12/1922 | Thompson | 126—382 |
| 1,470,963 | 10/1923 | Dorrance | 99—347 |
| 1,789,349 | 1/1931 | Ballman | 99—347 |
| 2,527,395 | 10/1950 | Burditt | 99—347 |
| 2,629,511 | 2/1953 | Gosnell | 126—381 |
| 2,980,105 | 4/1961 | Wanless | 126—382 |

ROBERT E. PULFREY, *Primary Examiner.*

JEROME SCHNALL, EUGENE R. CAPOZIO,
*Examiners.*